United States Patent
Wang

(10) Patent No.: US 11,550,932 B2
(45) Date of Patent: Jan. 10, 2023

(54) METHOD FOR A TERMINAL TO ACQUIRE AND ACCESS DATA

(71) Applicant: Black Sesame International Holding Limited, Santa Clara, CA (US)

(72) Inventor: Qingfei Wang, Wuhan (CN)

(73) Assignee: BLACK SESAME TECHNOLOGIES INC., San Jose, CA (US)

( * ) Notice: Subject to any disclaimer, the term of this patent is extended or adjusted under 35 U.S.C. 154(b) by 110 days.

(21) Appl. No.: 17/164,424

(22) Filed: Feb. 1, 2021

(65) Prior Publication Data
US 2022/0027480 A1    Jan. 27, 2022

(30) Foreign Application Priority Data

Jul. 21, 2020 (CN) .......................... 202010704253.2

(51) Int. Cl.
*G06F 21/60* (2013.01)
*H04W 12/71* (2021.01)
(Continued)

(52) U.S. Cl.
CPC .......... *G06F 21/602* (2013.01); *H04L 9/0631* (2013.01); *H04L 9/0643* (2013.01); *H04L 9/0861* (2013.01); *H04W 12/71* (2021.01)

(58) Field of Classification Search
CPC .... G06F 21/602; H04W 12/71; H04L 9/0631; H04L 9/0643; H04L 9/0861
See application file for complete search history.

(56) References Cited

U.S. PATENT DOCUMENTS

2017/0289196 A1    10/2017  Poliashenko et al.
2018/0067777 A1*   3/2018   Wang ................... G06F 11/368
(Continued)

FOREIGN PATENT DOCUMENTS

CN    101203000 A    6/2008
CN    102231744 A    11/2011
(Continued)

OTHER PUBLICATIONS

Xinlei Yang etc., P2P Based Massive Scalable Remote Sensing Data Distribution with Access Control, Nov. 15, 2017, computer science, Issue 11.

*Primary Examiner* — Ayoub Alata
(74) *Attorney, Agent, or Firm* — Timothy T. Wang; Ni, Wang & Massand, PLLC

(57) ABSTRACT

The method comprises the following steps: a terminal sending an acquisition request for acquiring data to a server, wherein the acquisition request comprises identification information for identifying the terminal; the server judging whether the terminal is a serviceable terminal according to the identification information; the server sending a request for the terminal to provide a first information when the judgment result is that the terminal is a serviceable terminal; the terminal sending the first information after receiving the request; the server receiving the first information and generating an encryption key for a configuration file based on at least the first information; the server processing the identification information by using a digest algorithm and writing the processing result into the configuration file; the server encrypting the configuration file with the encryption key; and the server sending the encrypted configuration file and the data to the terminal.

15 Claims, 7 Drawing Sheets

(51) Int. Cl.
*H04L 9/06* (2006.01)
*H04L 9/08* (2006.01)

(56) References Cited

U.S. PATENT DOCUMENTS

2018/0074808 A1* 3/2018 O'Connor ............... G06F 8/654
2020/0252288 A1* 8/2020 Al-Yousef ............ H04L 63/101

FOREIGN PATENT DOCUMENTS

| | | | |
|---|---|---|---|
| CN | 103235906 | A | 8/2013 |
| CN | 103914520 | A | 7/2014 |
| CN | 105450620 | A | 3/2016 |
| CN | 106034104 | A | 10/2016 |
| CN | 106415491 | A | 2/2017 |
| CN | 107241364 | * | 10/2017 |
| CN | 107251476 | A | 10/2017 |
| CN | 107517252 | A | 12/2017 |
| CN | 107659632 | A | 2/2018 |
| KR | 101560720 | B1 | 10/2015 |
| WO | 2016149889 | A1 | 9/2016 |

* cited by examiner

METHOD FOR A TERMINAL TO ACQUIRE AND ACCESS DATA

FIELD OF THE INVENTION

The current disclosure relates to a data acquisition technology, and more particularly, to a technology for a terminal to acquire data.

BACKGROUND OF THE INVENTION

With rapid improvement of the performance of handheld terminals such as mobile phones, more and more functions can be achieved. A database used for these functions, or an algorithm library used to realize these functions, is the achievement of the intelligence of developers. What developers expect is that these algorithm libraries are used by terminals through authorization, not used unauthorizedly. There are some loopholes in existing algorithm library protection methods, which can be cracked by simple attack means, which makes the algorithm library likely to be used in an unreasonable way without cost.

SUMMARY OF THE INVENTION

In view of this, this disclosure provides an improved method to enable the algorithm library to be used by authorized terminals.

According to one aspect of the application, a method for a terminal to acquire data is provided. The method comprises the following steps:

the terminal sending an acquisition request for acquiring data to a server, wherein the acquisition request comprises identification information of the terminal; the server judging whether the terminal is a serviceable terminal according to the identification information; the server sending a request for the terminal to provide a first information when the judgment result is that the terminal is a serviceable terminal; the terminal sending the first information after receiving the request; the server receiving the first information and generating an encryption key for a configuration file based on at least the first information; the server processing the identification information by using a digest algorithm and writing the processing result into the configuration file; the server encrypting the configuration file with the encryption key; and the server sending the encrypted configuration file and the data to the terminal.

According to another aspect of the disclosure, it provides a method for a terminal to acquire data, the method comprising: sending an acquisition request for acquiring data, wherein the acquisition request comprises an identification information for identifying the terminal; sending a first information when receiving a request for providing the first information; receiving an encrypted configuration file and the data, wherein the encrypted configuration file is related to the first information.

According to another aspect of the disclosure, it provides a method for a terminal to access data, the method comprises: detecting whether there is a configuration file related to the data to be accessed; in case of detecting the configuration file, the terminal generating a decryption key based on its identification information to decrypt the configuration file; extracting verification information from the decrypted configuration file; comparing the verification information with a verification code, and if they are consistent, the terminal accessing the data, wherein the verification code is generated by encrypting the identification information of the terminal.

According to another aspect of the current disclosure, it provides a method for a terminal to access data, the method comprising receiving an acquisition request for acquiring data from the terminal, wherein the acquisition request comprises identification information for identifying the terminal; processing the acquisition request, and judging whether the terminal is a serviceable terminal according to the identification information; sending a request for the terminal to provide a first information when the judgment result is that the terminal is a serviceable terminal; generating an encryption key for a configuration file based on at least the first information when the first information from the terminal is received; the server using a digest algorithm to process the identification information, and writing the processing result into a configuration file; encrypting the configuration file with the encryption key; and sending the encrypted configuration file and the data to the terminal.

According to yet another aspect of the current disclosure, it also provides a terminal, which comprises a processor and a storage unit, wherein instructions are stored in the storage unit, and when the instructions are executed by the processor, the method for the terminal to acquire data as described above is implemented, or the method for the terminal to access data as described above is implemented.

According to a further aspect of the current disclosure, it also provides a server, which comprises a processor and a storage unit, wherein instructions are stored in the storage unit, and when the instructions are executed by the processor, the method for the terminal to acquire data as described above is implemented.

DETAILED DESCRIPTION OF THE INVENTION

In order to make the above objects, features and advantages of the current disclosure more obvious and understandable, the specific embodiments of the current disclosure will be described in detail with reference to the accompanying drawings. In the following description, numerous specific details are set forth in order to provide a thorough understanding of the current disclosure. However, the invention can be implemented in many other ways different from those described here, and those skilled in the art can make similar improvements without violating the connotation of the invention, so the invention is not limited by the specific implementation disclosed below.

The method for a terminal to acquire data according to an example of the application can be implemented between a server and the terminal. The method will be described below with reference to FIG. 1.

Figure 1:
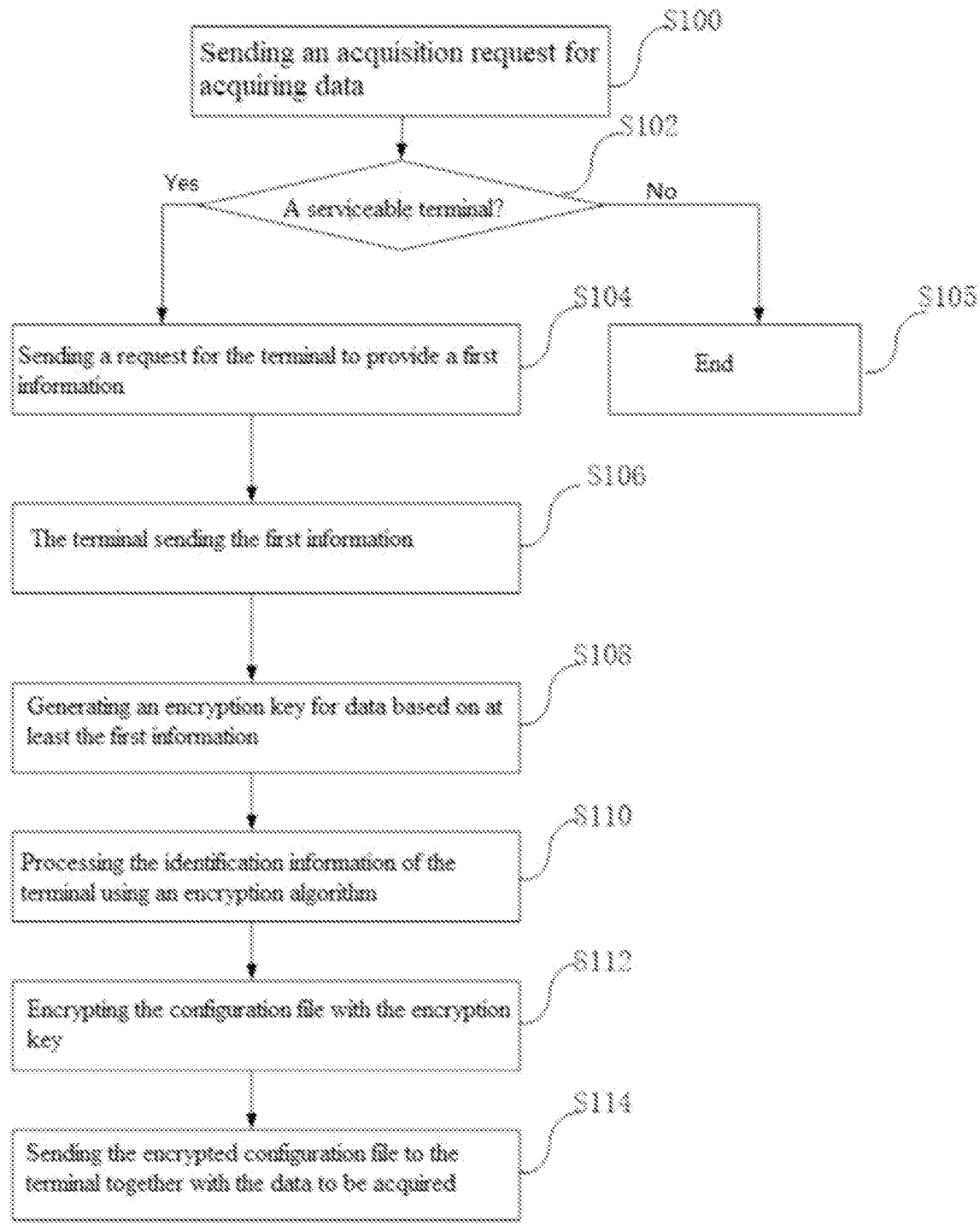
FIG. 1 is a flowchart of a method for a terminal to acquire data according to an example of the current disclosure.

FIG. 1 is a flowchart of a method for a terminal to acquire data according to an example of the current disclosure. As shown in the figure, in step S100, the terminal sends an acquisition request for acquiring data to the server, wherein the acquisition request includes identification information for identifying the terminal. At step S102, the server processes the acquisition request from the terminal, and judges whether the terminal is a serviceable terminal according to the identification information contained therein. A serviceable terminal refers to a terminal to which the server can provide services, such as providing data to be acquired by the terminal, allowing the terminal to interact with the server, and so on. In case the judgment result is that the terminal is a serviceable terminal, in step S104, a request for the terminal to provide a first information is sent. If it is determined that the terminal is not a serviceable terminal, the process proceeds to step S105 and ends. At step S106, after receiving the request sent at step S104, the terminal sends the first information. At step S108, the server receives the first information and generates an encryption key for a configuration file based on at least the first information. At step S110, the server uses a digest algorithm to process the identification information of the terminal and writes the processing result into the configuration file. For example, the identification information is manufacturing information and terminal model information of the terminal. At step S112, the configuration file is encrypted with the encryption key. At step S114, the encrypted configuration file is sent to the terminal together with the data to be acquired.

According to the example shown in FIG. 1, the server judges whether the terminal is a terminal that can use the service legally according to the identification information of the terminal, generates the key based on at least the first information provided by the terminal, and generates a configuration file based on the identification information. The configuration file is encrypted with the key, and the encrypted configuration file is sent to the terminal together with the data to be acquired. It can be seen that the generation of encryption information and configuration file is completely based on the identification information of the terminal and the first information from the terminal, thus protecting the data to be acquired to the maximum extent.

According to some examples of the current disclosure, preset information corresponding to the identification information of the terminal is set in the server in advance. According to these examples, judging whether the terminal is a serviceable terminal according to the identification information in step S102 includes matching the identification information from the terminal with the preset information, specifically matching the received identification information with the preset information. According to the example of this disclosure, the preset information can be manufacturing information and terminal model information of the serviceable terminal. Accordingly, the identification information sent by the terminal is its manufacturing information and model information. Furthermore, the manufacturing information is, for example, manufacturer information. In the example to be described below, by way of example but not limitation, the terminal sending identification information means sending the manufacturing information of the terminal and the terminal model information of the terminal. Further, according to some examples, the server requires that the first information sent by the terminal is unique identification information of the terminal. As an example, a HASH algorithm is used to calculate the identification information, and the calculation result is written into the configuration file.

In case the terminal is a mobile phone, the unique identification information is international mobile equipment identity (IMEI) of the mobile phone.

Figure 2:
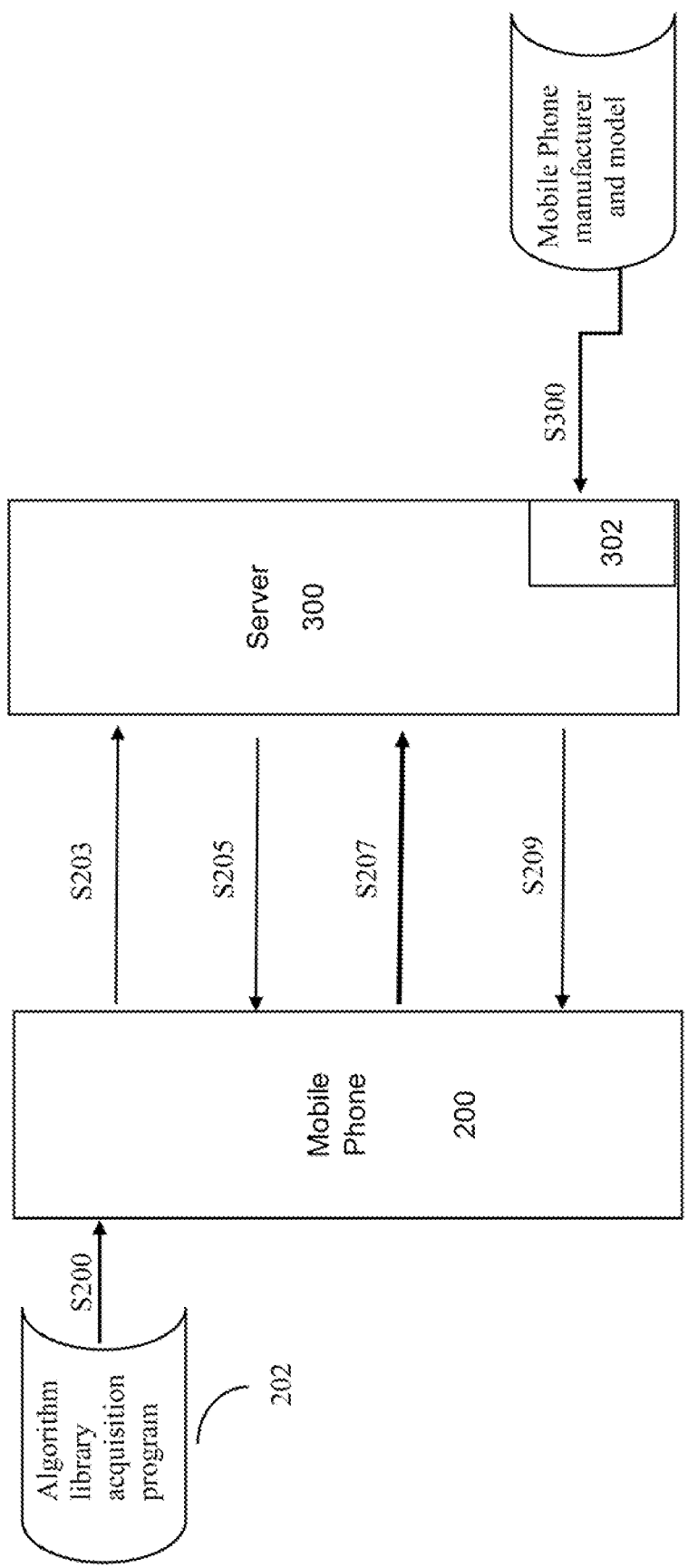
FIG. 2 is a communication interaction diagram of a method for a mobile phone to acquire data from a server according to an example of the current disclosure.

FIG. 2 is a communication interaction diagram of a method for a mobile phone to acquire data from a server according to an example of the present invention. In this example, by way of example, but not limitation, the server is a server of a party providing an algorithm library to the terminal. In this example, the data to be accessed or acquired by the mobile phone is the algorithm library.

As shown in the figure, in step S300, preset information, i.e., preset database 302 is stored on a server 300 in advance. In the preset database 302, relevant information of mobile phones for which the server 300 can provide algorithms is stored, for example, mobile phone manufacturing information and mobile phone models are stored, wherein the mobile phone manufacturing information is, for example, the identifier of a mobile phone manufacturer. There can be multiple mobile phone manufacturers and multiple mobile phone models, wherein there can be one or more mobile phone models corresponding to each mobile phone manufacturer.

At step S200, an algorithm library acquisition program 202 for acquiring the algorithm library provided on the server 300 is installed on the mobile phone. At step S203, the mobile phone runs the algorithm library acquisition program 202, and sends a request for acquiring the algorithm library to the server 300 through a communication module (not shown) on the mobile phone, The request also includes the manufacturer and model information of the mobile phone 200. The algorithm library acquisition program 202 can be implemented as an application set on a mobile phone, or an applet that can be run on a mobile phone.

At step S205, after receiving the request sent by the mobile phone, the server 300 processes the request to obtain the manufacturer and model information of the mobile phone 200 included in the request. At step S205, the server 300 further matches the obtained manufacturer and mobile phone model information with the information in the preset database 302, or alternatively the server 300 searches the preset database 302 for information matching the obtained manufacturer and mobile phone model of the mobile phone 200. In case that the information matching the manufacturer and model information of the mobile phone 200 is obtained from the preset database 302, the server 300 sends a request for the mobile phone 200 to provide an international mobile equipment identity (IMEI) in step S205. For example, when the server 300 matches the obtained manufacturer and mobile phone model information with the information in the preset database 302 and the matching is not successful, it stops, such as turning off the communication connection between the terminal 200 and the server 300.

At step 207, the mobile phone 200 sends its IMEI to the server 300 after receiving the request for providing the IMEI.

At step S209, after receiving the IMEI signal of the mobile phone 200, the server 300 generates an encryption key for a configuration file according to the manufacturer information of the mobile phone 200, the model information of the mobile phone and the IMEI number of the current mobile phone.

Further, in this step, a HASH algorithm is used to HASH the manufacturer information and the mobile phone model information, and the operation result is written into the configuration file. Finally, in step 209, the configuration file is encrypted with the encryption key, and the encrypted configuration file and algorithm library are sent to the mobile phone 200.

Here, the implementation process of the method shown in FIG. 2 is further exemplified without limitation. The server 300 obtains the manufacturer information man_id and the mobile phone model information type_id of mobile phone 200. The server 300 compares the man_id and the type_id with the preset information stored in the server database 302 to verify whether the mobile phone 200 is a serviceable terminal, so as to determine whether the terminal, that is, the exemplary mobile phone, can be authorized. It should be noted that the manufacturer information man_id and the mobile phone model information type_id, are decisive factors of whether the mobile phone can be authorized. In this example, both man_id and type_id are required to meet the requirements before being granted. For example, the mobile phone man_id indicates that the mobile phone is from A manufacturer, and the mobile phone model information type_id indicates that the mobile phone is an XY model. If the server 300 finds that there is A manufacturer in the server database 302, but there is no XY mobile phone model, the server 300 will not pass the verification, that is, the mobile phone 200 will not be considered as a serviceable terminal. When the server 300 finds that the server database 302 has both A manufacturer and an XY mobile phone model, it considers that the mobile phone 200 is a serviceable terminal. In case that the mobile phone 200 is judged to be a serviceable terminal, that is, the verification is passed, the server 300 requests the mobile phone 200 to send the first information, that is, its international mobile equipment identity (IMEI). According to a key generation algorithm, the server 300 takes man_id, type_id and IMEI as input parameters, and generates an Advanced Encryption Standard (AES) encryption key AES_KEY with a key length of 256 bits. In addition, the server 300 uses the HASH algorithm to process the parameters man_id, type_id and IMEI to generate a verification code mac_id, which is then written into the configuration file ini_file. Finally, the AES algorithm is used to encrypt the configuration file ini_file to obtain an encrypted configuration file e_ini_file, and then sends the encrypted configuration file to the mobile phone terminal 200 together with the algorithm library.

Figure 3:
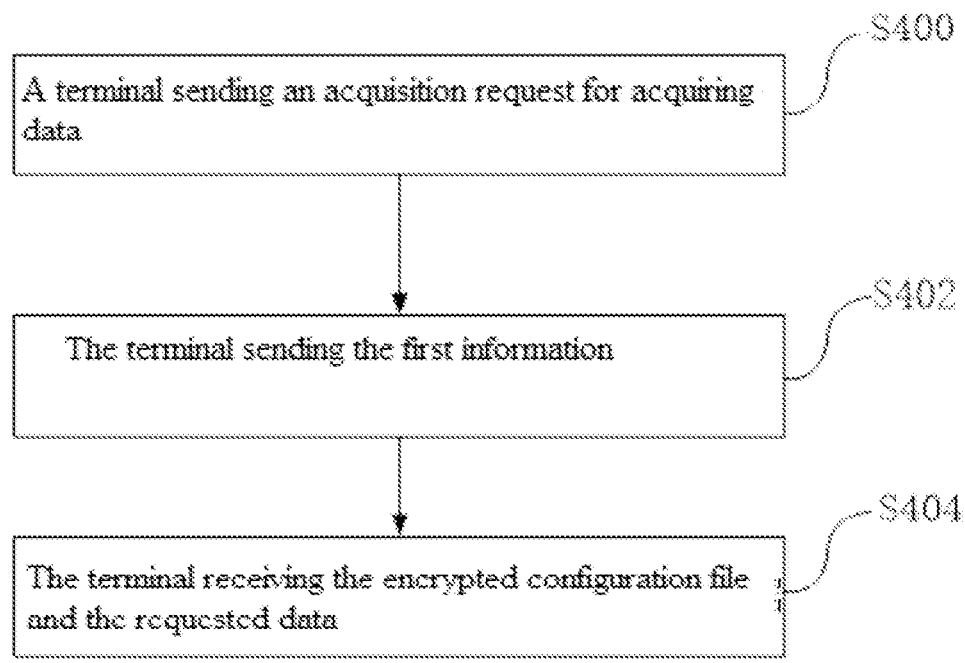
FIG. 3 is a flowchart of a method for a terminal to acquire data according to an example of the current disclosure.

FIG. 3 is a flowchart of a method for a terminal to acquire data according to an example of the current disclosure. As shown in the figure, in step S400, the terminal sends an acquisition request for acquiring data, wherein the acquisition request includes identification information for identifying the terminal. After sending the acquisition request, the terminal receives feedback and request it to send the first information. At step S402, the terminal sends the first information when receiving the request for sending the first information. After the terminal sends out the first information, in step S404, the terminal receives the encrypted configuration file and the requested data, wherein the encrypted configuration file is related to the first information.

In this example, the identification information can be manufacturer information and terminal model information of the terminal, and the first information is terminal unique identification information. By way of example, but not limitation, the terminal is a mobile phone, and the unique terminal identification code is an international mobile equipment identity (IMEI).

The method shown in FIG. 3 can be used in the method shown in FIG. 1 and implemented by the terminal, for example. In the case where the terminal is a mobile phone, the method shown in FIG. 3 can be applied to the part implemented by the mobile phone in the method shown in FIG. 2, for example.

Figure 4:
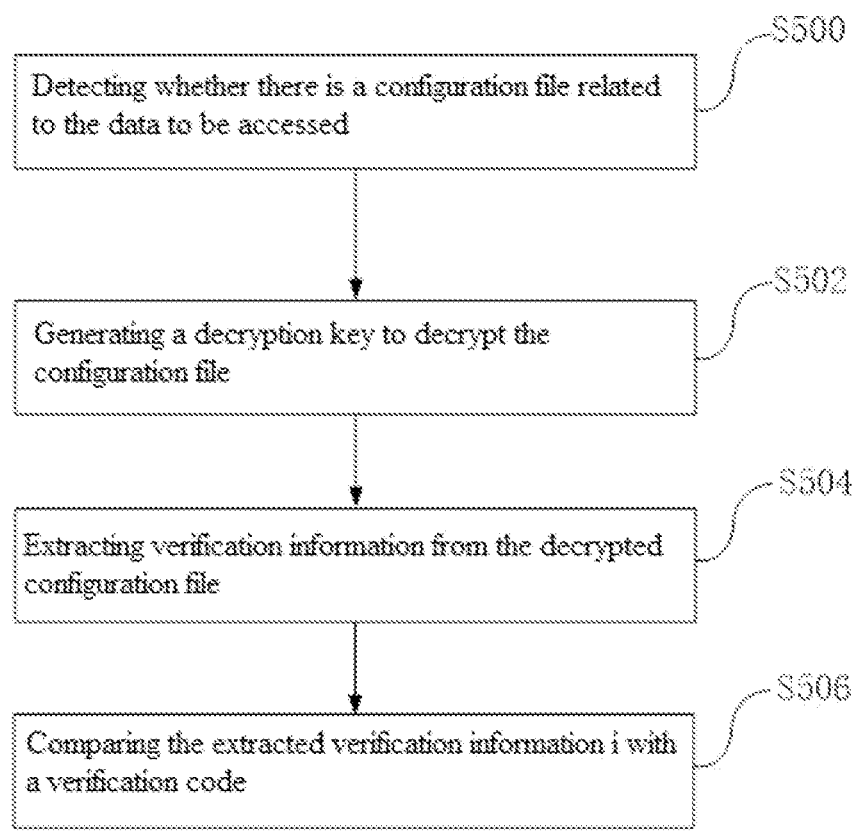
FIG. 4 is a flowchart of a method for a terminal to access data according to an example of the current disclosure.

FIG. 4 is a flowchart of a method for a terminal to access data according to an example of the current disclosure. As shown in the figure, in step 500, it is detected whether there is a configuration file related to the data to be accessed. This detection occurs, for example, when the terminal tries to access data already configured on the terminal, by a management module corresponding to the data. For example, if the data is implemented as an application, when the terminal tries to access the application already configured on the terminal, the application will first detect whether there is a configuration file. In case that the configuration file is not detected, for example, the access to data by the terminal is stopped or the access to data by the terminal is denied. If the configuration file is detected, in step 502, the terminal generates a decryption key based on the identification information of the terminal to decrypt the configuration file. At step 504, the terminal extracts verification information from the decrypted configuration file. At step 506, the extracted verification information is compared with a verification code, and if they are consistent, the terminal can access the database, wherein the verification code is generated by encrypting the identification information of the terminal.

Here, the verification code generated by encrypting the identification information of the terminal is, for example, generated by a provider of the data to be accessed on its server. By way of example, but not limitation, the terminal sends an acquisition request for acquiring data to, for example, a server providing the data to be accessed, and the acquisition request includes identification information for identifying the terminal. The server processes the received acquisition request, and judges whether the terminal is a serviceable terminal according to the identification information, for example, by comparing the identification information with preset information preset in the server database to judge whether there is information in the server database matching the identification information, and if there is the matched information, the terminal is determined as a serviceable terminal. Sending a request for the terminal to provide the first information when the judgment result is that the terminal is a serviceable terminal. After receiving the first request, the terminal sends the first information. The server generates an encryption key for the configuration file based on at least the first information. And the server uses a digest algorithm to process the identification information and generate a configuration file. The configuration file is encrypted with the encryption key. The encrypted configuration file is sent to the terminal along with the data to be accessed.

The identification information is, for example, manufacturing information and terminal model information, and the first information is, for example, unique identification information of the terminal. In case the terminal is a mobile phone, the unique identification information of the terminal is an international mobile equipment identity (IMEI).

Figure 5:
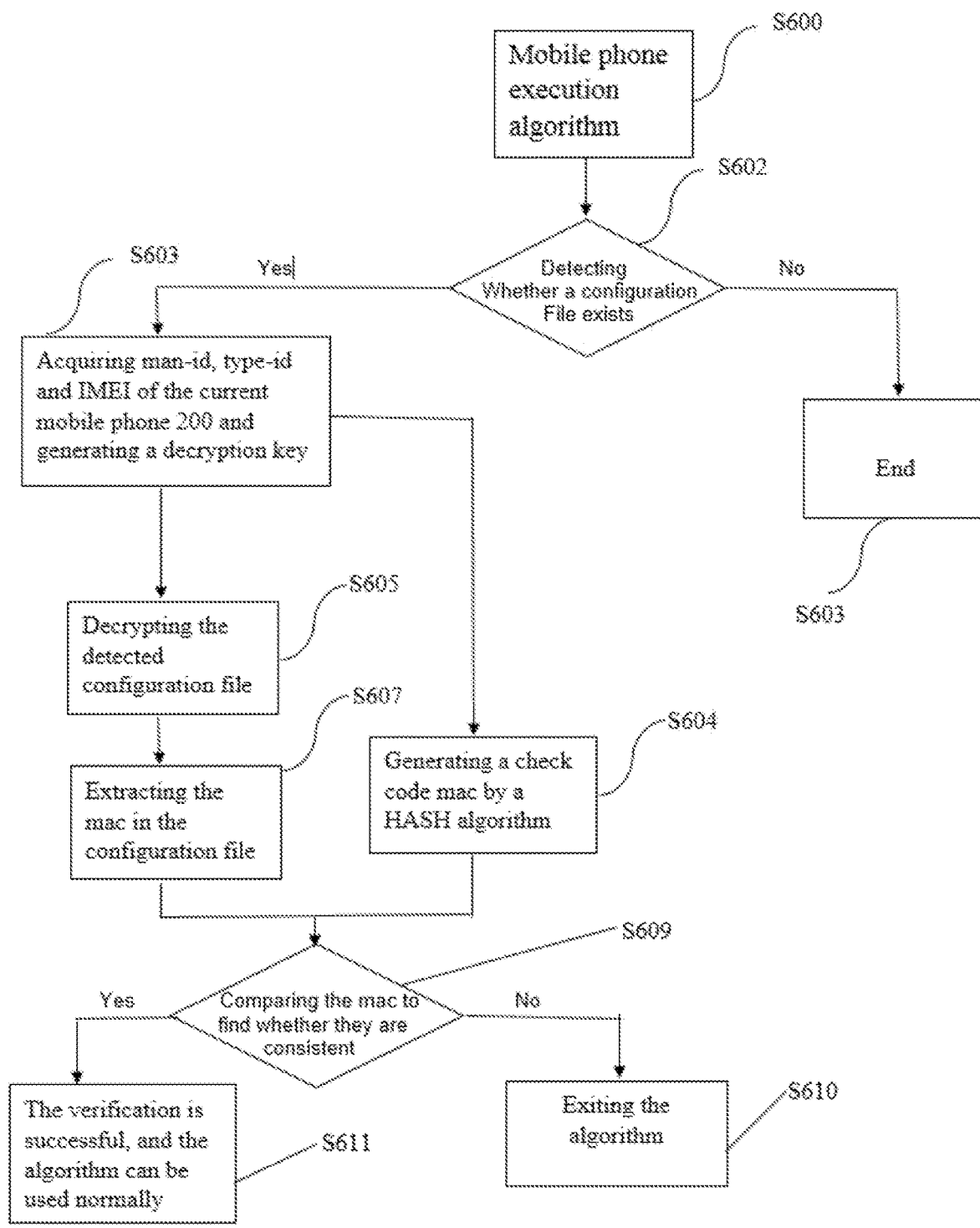
FIG. 5 is a flowchart of a method for a terminal to access data according to another example of the current disclosure.

FIG. 5 is a flowchart of a method for a terminal to access data according to another example of the current disclosure. The example of FIG. 5 will be explained in conjunction with FIG. 2. The mobile phone 200 has installed an algorithm library (not shown) with an encrypted configuration file provided by the server 300. At step S601, the mobile phone 200 accesses the algorithm library. At step S602, when the algorithm library receives the access from the mobile phone 200, it first detects whether the configuration file exists. If it does not exist, proceed to step S604 and end the access. If it exists, it goes to step S603 to acquire the man_id, type_id and IMEI of the mobile phone 200 and generate a decryption key. For example, the decryption key is generated by a key generation algorithm. At step S605, the detected configuration file is decrypted by the decryption key. For example, the decrypted configuration file e_ini_file is decrypted by the decryption key to form a decrypted configuration file d_ini_file. At step S604, a check code mac is generated for the man_id, type_id and IMEI acquired at step S603 by a HASH algorithm. At step S607, the mac in the configuration file is extracted from the decrypted configuration file; mac1 is obtained from the decrypted configuration file d_ini_file, for example. At step S609, the mac extracted from the configuration file is compared with the check code mac generated at step S604, for example, mac1 is compared with the check code mac generated at S604. In the case that they are consistent, the mobile phone 200 goes to step S611, and the verification is completed, indicating that the mobile phone 200 is authorized to use the algorithm library and the algorithm library works. If the comparison results in step S609 are different, the algorithm is exited.

The commonly used algorithms in HASH algorithm are MD4, MD5 and SHA series. Here, SHA-256 algorithm is mainly used, which combines inherent information and parameters of the mobile phone to generate a check code mac with a fixed length, and then writes it into the configuration file. The server generates AES encryption key according to man_id, type_id and IMEI of mobile phone, and encrypts the file.

At present, the key generation algorithm is widely used in network communication. Network communication generally adopts a method of "one-time pad" to ensure security of session and security of key. The application scenario of the present application is mainly local and does not need network transmission, so it focuses on security of digest algorithm and security of key generation. For the digest algorithm, an AES-256 algorithm is adopted herein. In order to ensure the security of the key, this application uses the key generation algorithm, that is, every time the encryption and decryption algorithm is called, the key generation algorithm interface is called. The advantage of this is that the key does not need to be saved locally, which greatly reduces the risk of key leakage. The key generation algorithms include obfuscation, table lookup and hash, which are briefly described as follows:

Obfuscation

The mobile phone man_id, type_id and IMEI are arranged in a certain way, and then filled with strings, etc., to obfuscate the key information and generate MSG1.

Table Lookup

Prepare a 16×16×16 2D TABLE with a range of [0,255]. The MSG1 is divided into two parts, namely MSG11 and MSG12. Then look up the TABLE with information in MSG11 and MSG12 (taking MSG11 as an example, any character C contains 8 bits, and then it is divided into three parts as TABLE indexes, index1=bit[1,2,3,4], index2=bit[3,4,5,6], index3=bit[5,6,7,8]), resulting in MSG2 and MSG3.

Hash

Use HASH-based Message Authentication Code (HMAC) algorithm, take MSG2 and MSG3 as inputs (MSG2 as message and MSG3 as Key), generate digest values with fixed lengths, and then select data with 256 bits length as AES key.

Through the above obfuscation and table lookup, the security of encryption key can be greatly improved. At the same time, encryption keys do not need to be stored and transmitted, which also brings some difficulties to key cracking.

It should be noted that although the algorithm library installed on the mobile phone 200 is not shown in the method for a terminal to access data described above in conjunction with FIG. 2 and FIG. 5, in some cases, the algorithm library can be an upgraded version of the algorithm library acquisition program 202, that is to say, after the mobile phone acquires the algorithm library through the algorithm library acquisition program 202 according to the method shown in FIG. 1, the algorithm library acquisition program 202 is updated as the unoptimized library.

Figure 6:
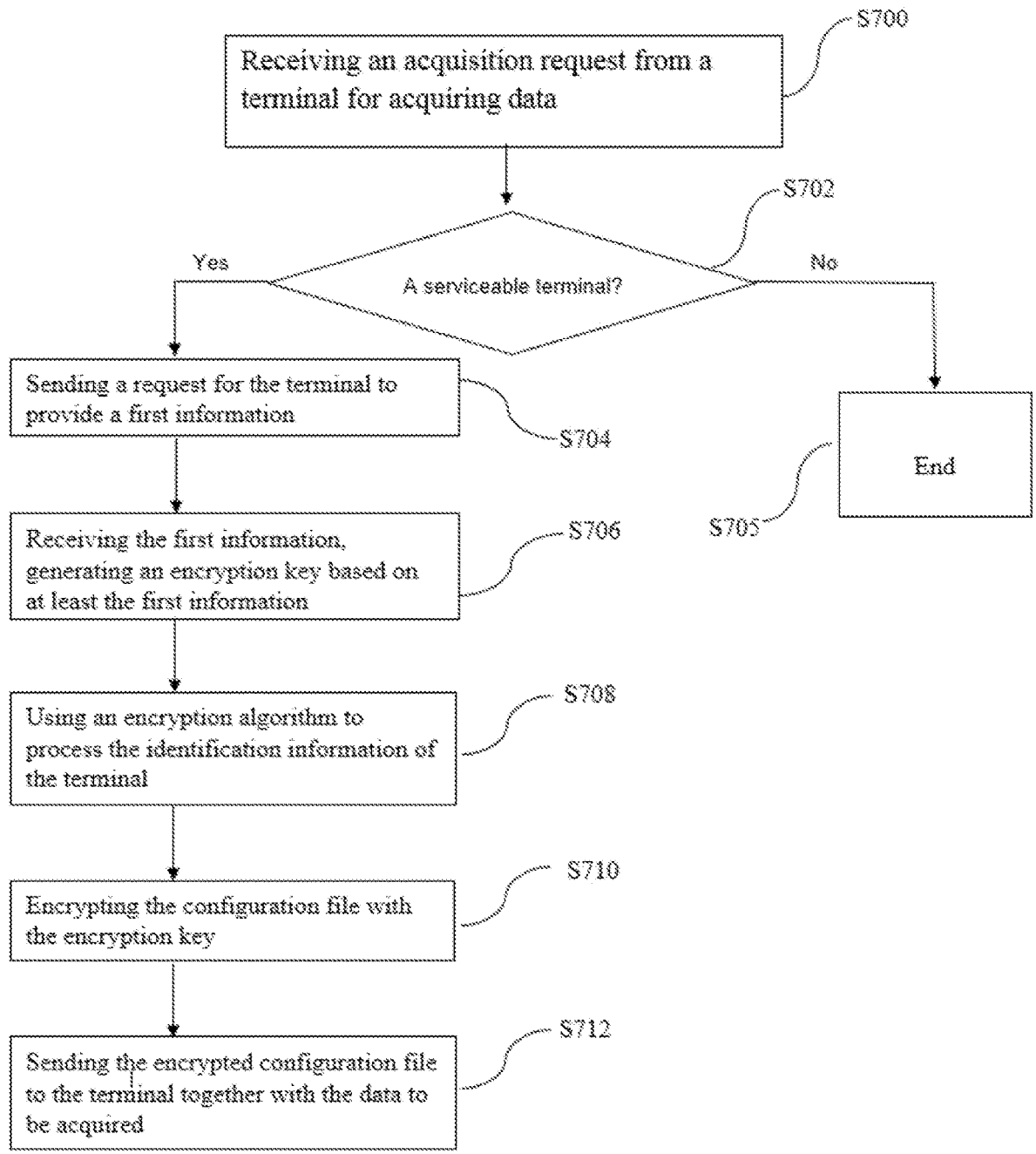
FIG. 6 is a method for a terminal to acquire data according to an example of the current disclosure.

FIG. 6 is a method for a terminal to acquire data according to another example of the current disclosure, which is implemented on a server. At step S700, an acquisition request from the terminal for acquiring data is received, wherein the acquisition request includes identification information for identifying the terminal. At step S702, the server processes the acquisition request and judges whether the terminal requesting data is a serviceable terminal according to the identification information. In step S704, when the judgment result shows that the terminal is a serviceable terminal, a request is sent for the terminal to provide a first information. If it is determined that the terminal is not a serviceable terminal, the process proceeds to step S703 and ends. Judging whether the terminal is a serviceable terminal or not is similar to the judgment mode mentioned above in other examples and will not be described again. At step S706, when the first information from the terminal is received, an encryption key for a configuration file is generated based on at least the first information. As for the first information, the encryption key and its generation, etc., the above described first information, encryption key and its generation can apply. At step S708, the server uses a digest algorithm to process the identification information and write the processing result into the configuration file. At step S710, the configuration file is encrypted with the encryption key. At step S712, the encrypted configuration file is sent to the terminal together with the data.

In the example described with reference to FIG. 6, with regard to the identification information, the first information, the digest algorithm, the generation of the encryption key, the encryption of the configuration file, etc., specific examples of the embodiments described with reference to other drawings above can apply. Here, they will not be described in detail. In this example, the data, that is, the data to be provided to the terminal is, for example, an algorithm library.

Figure 7:
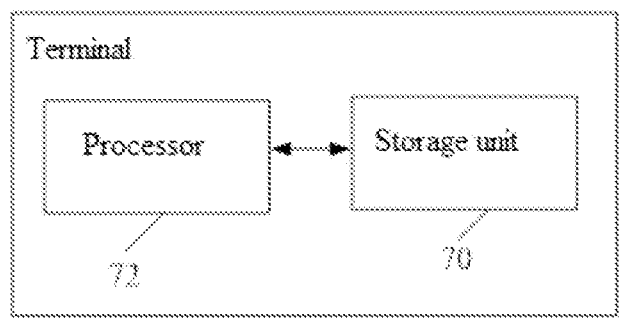
FIG. 7 shows a schematic structural diagram of a terminal according to an example of the current disclosure.

According to an example of the application, a terminal is also provided. FIG. 7 shows a structural schematic diagram of the terminal, in which other parts and components in the terminal that have nothing to do with the description here are not shown. As shown in FIG. 7, the terminal includes a processor 70 and a storage unit 72. The memory unit stores instructions, and when the stored instructions are executed by the processor 70, the method described above in connection with any one of FIG. 3, FIG. 4 or FIG. 5 is implemented. Similarly, the part executed by the terminal in the method described above in connection with FIG. 1 or FIG. 2 is also implemented. As an example, the terminal is a mobile phone.

Figure 8:
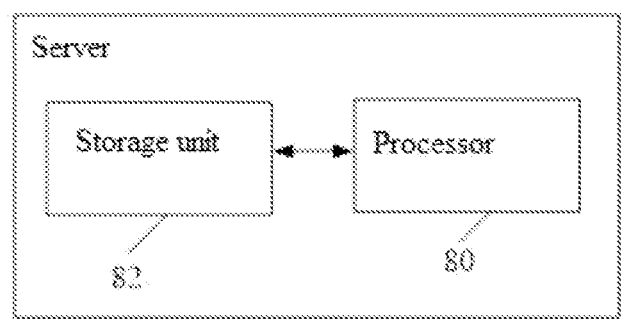
FIG. 8 shows a structural diagram of a server according to an example of the current disclosure.

According to an example of the application, a server is also provided. FIG. 8 is a schematic diagram of the structure of the server, in which other parts and components in the server that have nothing to do with the description here are not shown. As shown in FIG. 8, the server includes a processor 80 and a storage unit 82. The storage unit 82 stores instructions, and when the stored instructions are executed by the processor 80, the method described above with reference to FIG. 6 can be implemented, and the parts implemented by the server in the above examples can also be implemented.

The terminal shown in FIG. 7 and the server shown in FIG. 8 can be communicatively connected to implement the method described in connection with any one of FIGS. 1 and 2.

The above-mentioned embodiments only show several embodiments of the invention, and their descriptions are specific and detailed, but they cannot be understood as limiting the scope of the current disclosure. It should be noted that for those of ordinary skill in the art, without departing from the concept of the current disclosure, several modifications and improvements can be made, which belong to the protection scope of the current disclosure. Therefore, the scope of protection of the patent of the current disclosure shall be subject to the appended claims.

What is claimed is:

1. A method for a terminal to acquire data, comprising:
   the terminal sending an acquisition request for acquiring data to a server, wherein the acquisition request comprises identification information for identifying the terminal;
   the server judging whether the terminal is a serviceable terminal according to the identification information;
   the server sending a request for the terminal to provide a first information when the judgment result is that the terminal is a serviceable terminal;
   the terminal sending the first information after receiving the request;
   the server receiving the first information and generating an encryption key for a configuration file based on at least the first information;
   the server processing the identification information by using a digest algorithm and writing a processing result into the configuration file;
   the server encrypting the configuration file with the encryption key; and
   the server sending the encrypted configuration file and the data to the terminal.

2. The method for a terminal to acquire data of claim 1, further comprising setting a preset information corresponding to the identification information in the server in advance, and judging whether the terminal is a serviceable terminal according to the identification information comprises:
   matching the identification information from the terminal with the information in the preset information; and
   if the matching is successful, determining that the terminal is a serviceable terminal.

3. The method for a terminal to acquire data of claim 2, wherein the preset information is manufacturing information and terminal model information of the terminal, and the identification information is the manufacturing information and the terminal model information.

4. The method for a terminal to acquire data of claim 2, wherein the first information is a unique identification information of the terminal, and the digest algorithm is a HASH algorithm.

5. The method for a terminal to acquire data of claim 4, wherein the terminal is a mobile phone, and the unique identification information is an International Mobile Equipment Identity (IMEI) of the mobile phone.

6. The method for a terminal to acquire data of claim 1, wherein the data is an algorithm library.

7. A method for a terminal to access data, the method comprising:
   the terminal detecting whether there is a configuration file related to the data to be accessed;
   in case of detecting the configuration file, the terminal generating a decryption key based on its identification information to decrypt the configuration file;
   extracting verification information from the decrypted configuration file;
   comparing the verification information with a verification code, and if they are consistent, the terminal accessing the data, wherein the verification code is generated by encrypting the identification information of the terminal.

8. The method for a terminal to access data of claim 7, wherein the configuration file and the data are pre-configured in the terminal according to the following procedure:
   the terminal sending an acquisition request for acquiring data to a server, wherein the acquisition request comprises identification information for identifying the terminal;
   the terminal sending a first information after receiving a request from the server for the terminal to provide the first information, wherein the server sends the request for the terminal to provide the first information when judging that the terminal is a serviceable terminal according to the identification information;
   the terminal receiving the requested data and the encrypted configuration file sent by the server, wherein the encrypted configuration file is obtained in the following way: the server generates an encryption key for the configuration file at least based on the first information, processes the identification information by using a digest algorithm and writes a processing result into the configuration file, and the server also encrypts the configuration file by using the encryption key.

9. The method for a terminal to access data of claim 8, wherein the identification information comprises manufacturing information and terminal model information of the terminal, and the first information is unique identification information of the terminal.

10. The method for a terminal to access data of claim 9, wherein the terminal is a mobile phone and the unique identification information of the terminal is an international mobile equipment identity (IMEI).

11. The method for a terminal to access data according to claim 7, wherein the data is an algorithm library.

12. A method for a server to process an acquisition request from a terminal, comprising:
   the server receiving an acquisition request for acquiring data from the terminal, wherein the acquisition request comprises identification information for identifying the terminal;
   processing the acquisition request, and judging whether the terminal is a serviceable terminal according to the identification information;
   sending a request for the terminal to provide a first information when the judgment result is that the terminal is a serviceable terminal;

generating an encryption key for a configuration file based on at least the first information when the first information from the terminal is received;

the server using a digest algorithm to process the identification information, and writing p processing result into a configuration file;

encrypting the configuration file with the encryption key, and sending the encrypted configuration file and the data to the terminal.

13. The method for the server to process an acquisition request from the terminal of claim 12, wherein the identification information is manufacturing information and terminal model information of the terminal, the first information is unique identification information of the terminal, and the digest algorithm is a HASH algorithm.

14. The method for a server to process an acquisition request from the terminal of claim 12, wherein the data is an algorithm library.

15. A server comprising a processor and a storage unit, characterized in that instructions are stored in the storage unit, and when the instructions are executed by the processor, the method according to claim 12 is implemented.

* * * * *